United States Patent [19]

Rieder et al.

[11] Patent Number: 5,021,650
[45] Date of Patent: Jun. 4, 1991

[54] METHOD OF ELECTRONICALLY CORRECTING POSITION ERRORS IN AN INCREMENTAL MEASURING SYSTEM AND MEASURING SYSTEM FOR CARRYING OUT THE METHOD

[75] Inventors: Heinz Rieder, St. Pantaleon; Max Schwaiger, Ostermiething, both of Austria

[73] Assignee: RSF-Elektronik Gesellschaft m.b.H., Tarsdorf, Austria

[21] Appl. No.: 500,800

[22] Filed: Mar. 28, 1990

[30] Foreign Application Priority Data

Mar. 29, 1989 [AT] Austria .................................. 716/89

[51] Int. Cl.$^5$ ............................................. G01D 5/34
[52] U.S. Cl. ........................... 250/231.16; 250/237 G
[58] Field of Search ..................... 250/231.14, 231.16, 250/237 G; 341/13

[56] References Cited

U.S. PATENT DOCUMENTS 2,336,550 12/1943 Kruper .
2,985,826 5/1961 Fluegel .
3,039,032 6/1962 Fowler .
3,182,385 5/1965 Esposito .
3,713,139 1/1973 Sanford et al. ................. 250/237 G
4,445,110 4/1984 Breslow ............................... 341/13
4,680,466 7/1987 Kuwahara et al. ................... 341/13

Primary Examiner—Davis L. Willis
Assistant Examiner—Que Tan Le
Attorney, Agent, or Firm—Kurt Kelman

[57] ABSTRACT

In the operation of an incremental measuring system, a measuring scale is scanned for generating periodic sinusoidal, analog measured-value signals. Digital countable signals are derived from the measured-value signals in conjunction with an electronic subdivision of the scale and are delivered to an electronic evaluating unit. Each countable signal is associated with a certain phase angle of the measured-value signals. For an electronic correction of position errors, predetermined signal levels are detected at a series of first points, which have an electrical spacing corresponding to a sub-incremental step constituting a fractional part of a scale increment, and these signal levels are alternatively detected at a series of second points, which have the same electrical spacing as the first points and are offset by a fractional part of this spacing, and in accordance with a correction program the measurement is selectively evaluated in response to the signal levels at these points so that corrections can be effected in steps corresponding to only a fractional part of such sub-incremental step.

12 Claims, 4 Drawing Sheets

METHOD OF ELECTRONICALLY CORRECTING POSITION ERRORS IN AN INCREMENTAL MEASURING SYSTEM AND MEASURING SYSTEM FOR CARRYING OUT THE METHOD

BACKGROUND OF THE INVENTION

1. Field of the Invention

This invention relates to a method of electronically correcting position errors in the operation of an incremental measuring system, particularly of an incremental system for measuring lengths, in which a measuring scale is scanned by a scanning unit for generating periodic, basically sinusoidal, analog measured-value signals, and digital countable signals, which depend on the direction of movement of the scanning unit relative to the scale, are derived from said measured-value signals in conjunction with an electronic subdivision of the scale and are delivered to evaluating means, wherein each countable signal is associated with a predetermined phase angle of the measured-value signals.

This invention relates also to an incremental measuring system in which a measuring scale is scanned by a scanning unit for generating periodic, basically sinusoidal, analog measured-value signals, which are delivered to a dividing circuit, which in conjunction with trigger stages and pulse-shaping stages effects an electronic subdivision of the scale and generates digital countable signals, which depend on the direction of the movement of the scanning unit relative to the scale and are derived from said measured-value signals and delivered to evaluating means, such as indicating or control means. Electronic means for correcting errors are provided.

2. Description of the Prior Art

In the operation of incremental measuring systems, particularly of incremental systems for measuring lengths, a properly designed incremental scale is scanned by optoelectronic, capacitive, inductive or magnetic scanning methods. In most cases two measured-value signals, which are displaced 90° in phase, are delivered to the evaluating means and in most cases a period of the measured-value signals corresponds to an increment of the scale. If incremental scales are used which are optically or opto-electronically readable the measuring scale will preferably consist of bright and dark fields, which are equal in width and are scanned by means of scanning gratings, which have the same increments but are offset from each other by a fractional part of an increment, with the use of illuminating means and photoelectric receivers associated with said gratings. Four photoelectric receivers which are connected in pairs in a back-to-back connection are preferably used to generate two analog measured-value signals.

CH-A-407,569 discloses how the scale can be electronically subdivided by a dividing circuit, which comprises a potentiometer circuit and in which the zero crossings or the slope reversals of the analog measured-value signals appearing at several potentiometer taps are detected by the trigger stages. Dividing circuits are often used which multiply the number of measured-value signals by five so that a slope reversal of the square-wave measured-value signals will be effected at the several trigger stages at intervals of 18°, with reference to the analog measured-value signal. The signals resulting from that division are logically combined to produce the digital countable signals, which are delivered in a sense which depends on the direction of the scanning movement to a counter. The direction of the scanning movement can be detected because one or the other of the analog measured-value signals leads, in dependence on the direction of the scanning movement.

CH-A-650 334 discloses a different dividing circuit, in which the analog measured-value signals are modulated with alternating voltages at a higher frequency. Said alternating voltages are generated by means of a system clock with the aid of scalers and pulse shapers. The scalers determine a fixed ratio of division and can be adjusted to other ratios of division. Pulses are generated in a number which depends on the phase angle of the measured-value signal, i.e., on the instantaneously scanned sub-increment or fractional part of an increment of the incremental scale, and said pulses are counted by a counter. That arrangement can be used for an electronic division of a scale increment by a fixed ratio of division, such as 100.

Errors may occur in a measurement of lengths and angles and will adversely affect the result of the measurement, particularly in the case of measurements or of a control of machines at high accuracy, unless said errors are corrected. Position errors may often result from errors of the increments of the incremental scale or from errors in the mounting of a system for measuring lengths on an associated machine and/or from errors of the machine. Other errors, which in most cases are linear, may enter the measurement as a result of differential thermal expansion of a scale member which is provided with a longitudinal scale and a machine bed and as a result of a deviation of the scale from an exact parallelism relative to an associated track of a machine.

In known electronic correcting methods, simple circuits are used by which the count that is delivered to the indicating or control means is corrected by a value which is stored in a correction table for each count. A disadvantage of said methods resides in that the count will be suddenly changed for each correction by at least one countable step. In an extreme case, if a correction requires a reversal of the direction of movement and a repeated approach of the scanning unit to the point which is to be measured, a correction by a plurality of countable steps may be required at a correction point. Owing to said sudden changes of the count, a continuous counting is not possible and, as a result, an equivalent value (which has been obtained by a continual counting) will not be obtained for certain positions of the scanning unit. In machine controls which are provided with such correcting means that fact might result in severe disturbances in the operation. It is known that these disadvantages can be eliminated in that digital countable signals are suppressed or additional ones are introduced before the input of the counting stage, e.g., in the pulse-shaping stage. But even in that case there will be sudden changes at the correction points and will result in measurement errors at least of an order of that fractional part of a scale increment which corresponds to one or more countable steps. Even a correction in dependence on stored correcting values and with the aid of an interpolating computer may result in similar inaccuracies and, in addition, will require a computer to be incorporated in the measuring system.

In the known electronic correcting methods, inaccuracies of an order of a length or angle which is associated with at least one countable step may occur in the measurement or indication and large changes of the count must often be tolerated. For this reason, mechanical correcting methods and mechanical correcting means have previously been preferred where measurements and corrections of high accuracy were required. Those methods and means are based on the principle that the scanning unit is adjusted by correcting drives in the direction of the scanning movement relative to the coupling member provided for displacing the scanning unit. The correcting drives scan correcting templates, which are accomodated in a housing that contains the scale member and are individually adjustable and in response to the scanning of said templates the correcting drives advance or retract the scanning unit relative to that coupling member. Such correcting methods and correcting means are known from DE-C-866,403 and from U.S. Pat. No. 3,039,032; 3,182,385; 2,336,550; and 2,985,826. In accordance with DE-C-27 24 858 the scannable correcting template is constituted by a link chain, which is mounted to extend along a linear scale and is adjusted at its articulated joints by means of eccentrics which are operable from the outside. Contrary to the stepwise correction effected by the known electronic correcting methods, said known mechanical correcting methods permit a continuous correction in several ranges of the scale. The corrections are limited by the extent to which the scanning unit can be adjusted relative to the coupling member, and that limitation will be significant particularly in case of relatively large linear errors in the measurement, and in the case of a large spacing of the points at which the correcting template can be adjusted. This means that the corrections cannot be effected to any extent which may be required. The mechanical correction involves a very high expenditure and requires the use of a much larger housing for the measuring system and of a relatively large scanning unit, which must be provided with the required correcting drives and must have a relatively heavy weight, and the mechanical correction cannot be effected unless the measuring system has inherently been designed for a performance of such mechanical corrections. In case of linear scale errors of metal scale members a continuous correction can be effected in that the scale member is elongated or upset. But that practice also involves a considerable expenditure and a severe restriction regarding the design of the measuring system.

SUMMARY OF THE INVENTION

It is a first object of the invention to provide an electronic correction of position errors which permits corrections to be effected with simple means and without a change of the scale member and of the scanning unit and without an occurrence of stepwise count changes or equivalent errors in measurement at the correction points and in which an almost stepless correction curve will be obtained, the extent of the possible correction will not be limited and the corrections can freely be programmed if this is required.

It is a second object of the invention to provide an incremental measuring system which is of the kind described in the second paragraph of this description and which can be used to effect corrections by the new method.

The first object set forth hereinbefore is accomplished in that a correction of errors is permitted in that predetermined signal levels are detected at a series of first points, which have an electrical spacing corresponding to a sub-incremental step, which is substantially as large as a fractional part of a scale increment, said predetermined signal levels are alternatively detected at at least one series of second points, which have the same electrical spacing as said first points and are offset from said points of each other of said series by a fractional part of said electrical spacing, and in accordance with a correction program the measurement is selectively evaluated in response to the signal levels at said points of each of said series so that corrections can be effected in steps corresponding to only a fractional part of such subincremental step. In accordance with the invention, correcting steps are performed which amount to only a fractional part of a countable step. As a result, the disadvantages pointed out hereinbefore will entirely be avoided. On principle, the method in accordance with the invention may be reduced to practice with dividing circuits or with other dividing stages, e.g., with measuring systems which are provided with dividing stages as disclosed in CH-A-650,334. In the latter case the ratio of division which is used to define the correcting steps may be higher than the ratio of division which would otherwise be required for the generation of the countable pulses. To effect a correction, a countable step will be initiated at a given correction point if a correction is required there, and the countable step performed at the correction point will correspond to the standard countable step plus or minus the correcting step.

The second object set forth hereinbefore is accomplished in that two or more dividing circuits are provided, in which the taps have the same electrical spacing but the taps of each of said dividing circuits are electrically offset from the taps of each other one of said dividing circuits by a fractional part of said electrical spacing and an electronic selecting switch is provided, which is controlled in accordance with a correcting program and adapted to selectively connect each of said dividing circuits to electronic evaluating means.

In such a measuring system the means for correcting errors may be mounted instead of the otherwise provided single dividing circuit, which is usually externally disposed, and the output signals can be processed further in the same manner as those of a single dividing circuit. A change from one dividing circuit to the next will result in a correcting step, which will be equal to that fractional part of a countable step which is determined by the number of dividing circuits and may be negligibly small. Because the ratio of division of the dividing circuits is equal, the phase angles between successive taps of a dividing circuit will be sufficiently large and the evaluating means need not be changed. The sensitive electronic correction in steps which correspond to only fractional parts of a countable step is comparable in that respect to the known mechanical correction but in comparison to the latter has the advantage that the correction curve can be adapted to any error curve in case of need by a suitable programming of the operation of the selecting switch. In the method in accordance with the invention the correction curve can be obtained by a control of the selection of the various dividing circuits.

The selecting switch may be connected between the dividing circuits and common trigger and pulse-shaping circuitry, which is associated with the evaluating means. In that case it will be possible to use analog-value selector switches, which select the dividing circuits, which in most cases consist of iterative resistor circuits, and may connect the selected dividing circuit, so that common trigger and pulse-shaping circuits may be used.

Integrated circuits are known in which the trigger and pulse-shaping stages constitute small modules, which can easily be integrated, and it is even possible to combine a trigger stage with each dividing circuit. Where such modules are used, it will be suitable to associate a separate trigger and/or pulse-shaping stage with each dividing circuit and to provide a digital data selecting switch which succeeds said trigger and/or pulse-shaping stages. In such an arrangement a high counting rate can be achieved in conjunction with an exact switching and in an arrangement comprising more than two iterative dividing circuits the selecting switch will be required to make a fewer number of connections.

In the practice of the invention an adaptation to the existing trigger and pulse-shaping stages and/or the succeeding evaluating stages will be effected in order to avoid control or indication errors. The evaluating means may comprise bidirectional counters, counting means including free-running counters for/the two directions of the scanning movement and a microcomputer for detecting the instantaneous counts of said counters and for logically combining said counts with previously detected and stored data, or similar circuit arrangements. Wrong pulses can be avoided in that the selecting switch is synchronized with the occurrence of a predetermined level in at least one of the analog measured-value signals, preferably of the zero crossing thereof. In that case the switch will effect a connection to the next following dividing circuit only when the switching command has been received and the predetermined level has subsequently occurred. A control logic may be associated with the selecting switch and may permit an operation of the selecting switch only after a countable signal has been picked off from the currently connected dividing circuit.

Particularly for a compensation of linear errors, a circuit may be used in which the countable signals are delivered to a presettable counter, which serves to control the electronic selecting switch and which generates a command for operating the selecting switch whenever the counter has counted to the present count. If a plurality of dividing circuits are employed, the direction in which the selecting switch is operated, i.e., that of the iterative dividing networks which is to be connected, will also be predetermined. An adaptation to any desired correcting curve in linear sections can be achieved in that the count to which the control counter is preset is changed in dependence on the position of the scanning unit relative to the scale. An error which is due to temperature may be corrected in that the counter can be preset to a count which depends on the ambient temperature, which is detected by a temperature sensor. Any desired correction can be effected if the selecting switch is controlled by a correcting memory, which contains addresses, which are adapted to be required in dependence on the position of the scanning unit relative to the scale. The correcting memory may be programmed to contain fixed stored data when it is made or may freely br programmable by means of an input device.

DETAILED DESCRIPTION OF THE PREFERRED EMBODIMENTS

Figure 1:
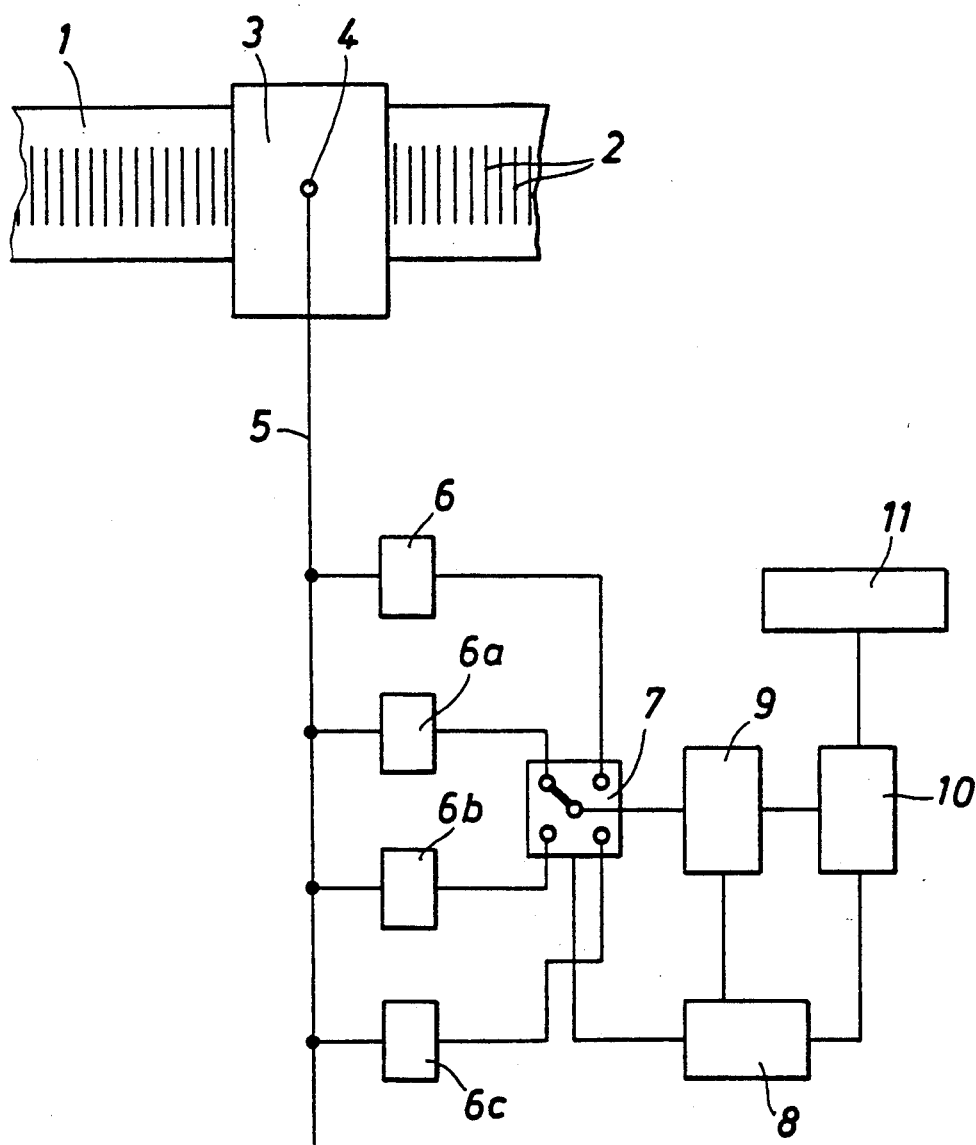
FIG. 1 is a highly simplified block circuit diagram representing a system for measuring lengths.

Further details and advantages of the invention will become apparent from the following description of the drawing.

In accordance with FIG. 1 a scale member 1 is preferably encapsulated in a housing and is provided with a measuring scale 2, which consists of bright and dark fields arranged in alternation. A scanning unit 3 is movable along the scale member 1 by means of a coupling member. The scanning unit 3 comprises photoelectric receivers, which are illuminated through the scale and through scanning gratings, which are offset from each other by a fractional part of an increment of the scale. Analog measured-value signals, which are displaced in phase relative to each other, appear at the outputs of the photoelectric receivers. Under normal conditions, two basically sinusoidal measured-value signals, which are displaced 90° in phase, appear at the output 4 and are transmitted via single-pole leads 5 to means for a further processing.

Two or more dividing circuits 6, 6a, 6b, 6c are connected in parallel to each other to the leads 5. The number n of the dividing circuits which are provided equals the denominator of the fraction which indicates the magnitude of a correcting step relative to a countable step.

Each of the dividing circuits 6 to 6c can be connected to a succeeding trigger and pulse-shaping stage 9 by an electronic selecting switch 7, which is controlled by a control logic 8. During the movement of the scanning unit along the scale trigger levels of the analog measured-value signals generated by the scanning unit 3 appear at that of the dividing circuits 6 to 6c which is connected by the selecting switch 7. In response to the detection of said trigger levels, electronic countable signals are generated in the trigger and pulse-shaping stage 9 in such a manner that each increment of the scale is electronically subdivided. The digital countable signals are delivered to a processor, which may consist of a counter 10 and succeeding indicating means 11. The dividing circuits 6 to 6c have the same ratio of division but the taps at which the trigger levels of the analog measured-value signals appear along each dividing circuit are offset from the taps of each other dividing circuit by a fractional part of the electrical spacing of the taps. As a result, a correction by a correcting step which is equal to that fractional part of a sub-incremental step, which is substantially as large as a fractional part of a scale increment, can be effected by an operation of the selecting switch 7. The sense in which the selecting switch 7 is operated will be controlled by the switching logic 8. The arrangement may be such that an operation of the selecting switch in one sense will always be effected inmmediately after the last countable step has been picked off from the currently operating dividing circuit and the first trigger level signal available from the newly connected dividing circuit will be suppressed if the number of countable steps which are counted is to be reduced by a plurality of corrections.

During an operation of the selecting switch 7 in that sense a complete cycle of operations of the selecting switch 7 in the same sense to effect four correcting steps will result in an indication which is lower by one countable step. If the selcting switch 7 is operated four times in the reverse sense to connect the dividing stages 6 to 6c in succession, the count will be higher by one countable step than as a result of an operation in which the position of the switch 7 is not changed during a scanning of the same scale over the same length.

The switching logic 8 for the switch 7 may be controlled from a memory and from the control unit 10 so that any desired correction curve can be achieved by a controlled operation in the two senses.

Figure 2:
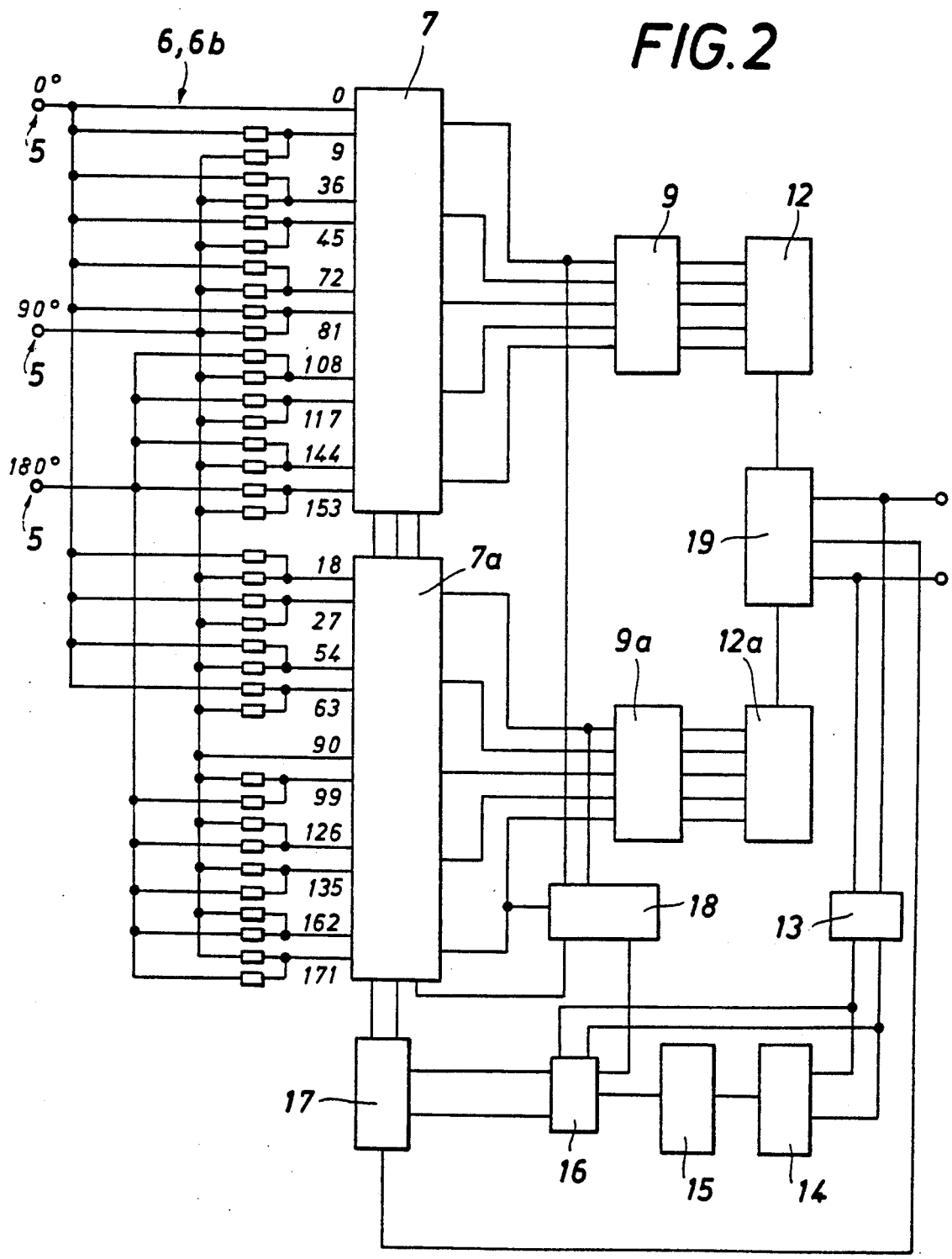
FIG. 2 furnishes a more detailed explanation of the mode of operation by showing a correcting device that comprises two dividing circuits, an associated selecting switch, trigger and pulse-shaping stages and means for controlling the selecting switch.

After the previous explanation of the correction with reference to FIG. 1, an embodiment comprising only two dividing stages will now be explained more in detail with reference to FIGS. 2 and 3. In that circuit arrangement, two iterative dividing circuits 6, 6b are provided, which can be used to effect a correcting step which is equal to one-half of a countable step. The dividing stages 6, 6b consist of iterative resistor circuits. In the dividing stage 6, trigger level signals appear at taps arranged at 0/18/36/54/72/90/108/126/144/162 electrical degrees. In the dividing stage 6b, trigger level signals appear at taps arranged at 9/27/45/63/81/99/117/135/153/171 electrical degrees. By means of the electronic analog-value selecting switch 7, 7a either the dividing stage 6 or the dividing stage 6b is connected to trigger stages 9, 9a, each of which has associated with it a combining logic that includes a pulse-shaping stage 12, 12a, which is separately shown in this embodiment, different from FIG. 1. When the selecting switch 7, 7a is operated to connect the dividing stage 6b rather than the dividing stage 6, this means that when the first trigger level signal is not detected at a tap arranged at 0 electrical degree but will be detected at 9 electrical degrees rather than at 18 electrical degrees or will be detected at 27 electrical degrees if the trigger level signal appearing at 9 electrical degrees is suppressed by the switching logic. As a result, a correcting step will be performed which is equal to one-half of a countable step.

The control logic comprises a pulse-quadrupling circuit 13, which is known per se and is connected by a switching logic 19 to the pulse-shaping stages 12, 12a. The pulse-quadrupling circuit comprises a direction detector 13, from which the direction-dependent countable pulses are delivered to a bidirectional counter 14. In the simplest case, for a linear correction, the counter 14 has a adjustable ratio of division. For a non-linear correction, a decoder stage 15 is required, which comprises a memory and may be programmed by means of an input unit, not shown here, or is provided with a preprogrammed read-only memory. The counter-decoder unit 14, 15 may alternatively be constituted by a computer, which comprises a read-only memory and in which correction points may be input via an input unit or external interfaces. The signal which appears at the output of the stage 14, 15 and serves to initiate a correcting step is so processed in a synchronizing stage 16 that a direction-dependent countable pulse will be delivered from the desired tap (preferably at 0 or 9 electrical degrees) to an address counter 17, which constitutes a part of the switching logic 8 and serves to actuate the analog-value selecting switches 7, 7a for switching the dividing stages.

In order to avoid an occurrence of wrong pulses, each correcting step will be associated with a predetermined point of the periodic analog measured-value signals and the correcting step will preferably be effected at 0 electrical degrees. That synchronization is effected in the synchronizing stage 16, which will not initiate a counting step of the addresss counter 17 unless said condition is met. An enabling logic 18 will ensure that a given dividing stage 6 or 6b will not be switched at the switching point at 0 to 9 electrical degrees unless the trigger-level tap of the adjacent stage has been reached so that an additional switching via the trigger output and the generation of a wrong pulse at that time will be avoided.

The above-mentioned switching logic 19 is provided to permit consecutive corrections in the same sense to be effected with simple means so that the signals can be processed further without a disturbance when correcting steps have been performed in a number which corresponds to a complete countable step. That object might theoretically be accomplished in that the analog-value selecting switches 7, 7a are advanced by an entire stage when corrections have been effected which correspond to an entire countable step. In that case the switch part which has previously been connected to the tap at 0 or 9 electrical degrees may be switched to the tap at 36 or 45 electrical degrees. By means of the switching logic 19, the same object can be accomplished with simpler means in the digital part of the circuit. For that purpose the switching logic 19 is controlled by the address counter 17 and in dependence on the control signals changes the connection of the pulse-shaping stages 12, 12a to the outputs which lead to the means for further processing.

Figure 3:
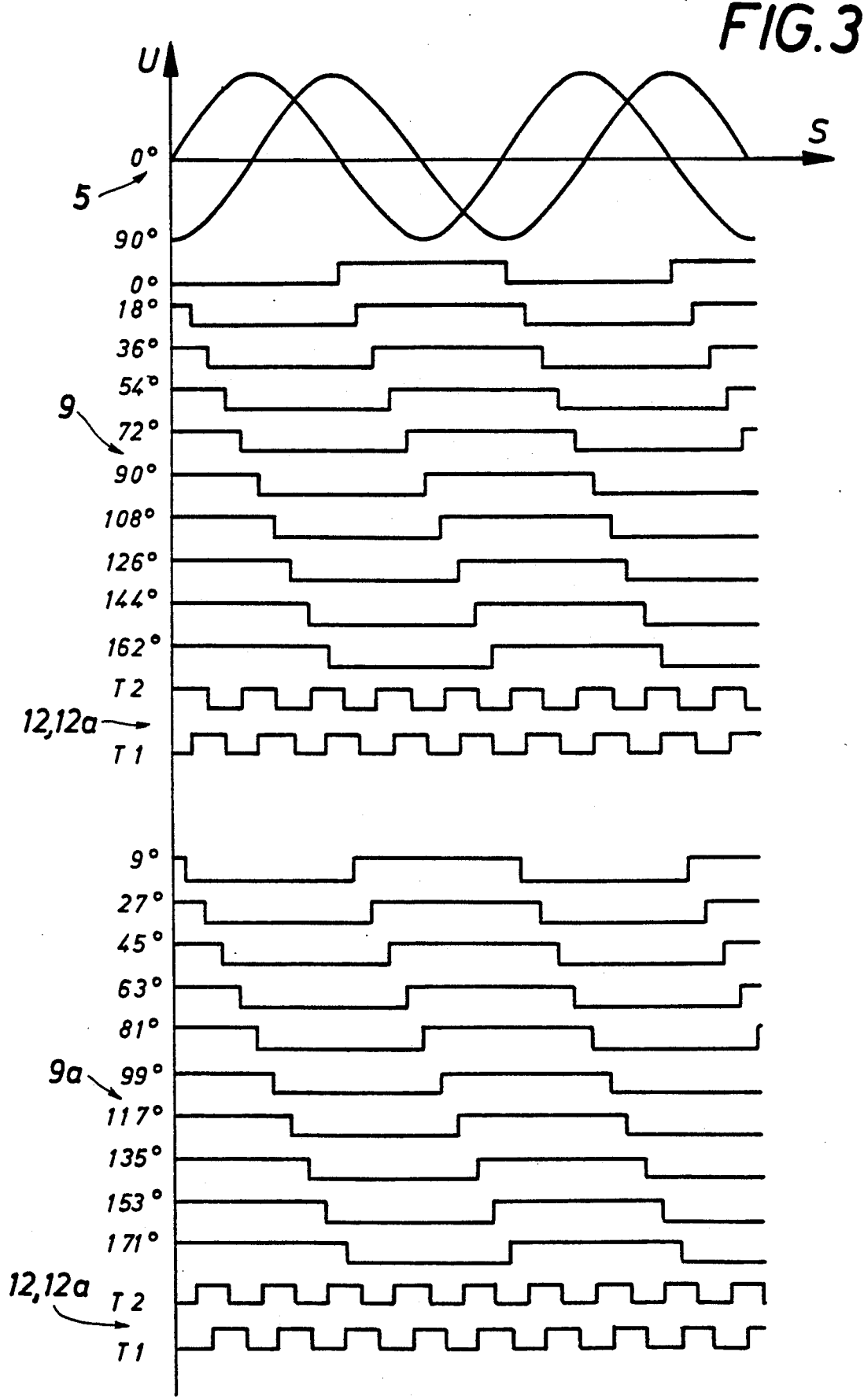
FIG. 3 is a graph indicating how the digital countable signals are derived from the analog measured-value signals with the aid of the two dividing circuits.

To facilitate the understanding of the mode of operation of the circuit arrangement in accordance with the invention, FIG. 3 represents the analog signals appearing on the lines 5 and the derivation of the countable signals T1, T2 tapped from the dividing stages when the dividing stage 6 or 6b has been connected.

At least theoretically the circuit might be simplified if the scanning unit 3 or a shaping stage succeeding the scanning unit generates analog measured-value signals which are exactly triangular. In that case a single iterative dividing circuit might be used and the switch 7 might be actuated to connect resistors in series in order to effect a phase displacement of the taps of the dividing circuit.

Particularly if the circuit 14, 15 consists of a computer, external parameters and a linear error resulting there from, e.g., independence on thermal expansion, might be compensated in that temperature sensors are provided, which effect corresponding corrections by a periodic operation of the switch 7, 7a.

Figure 4:
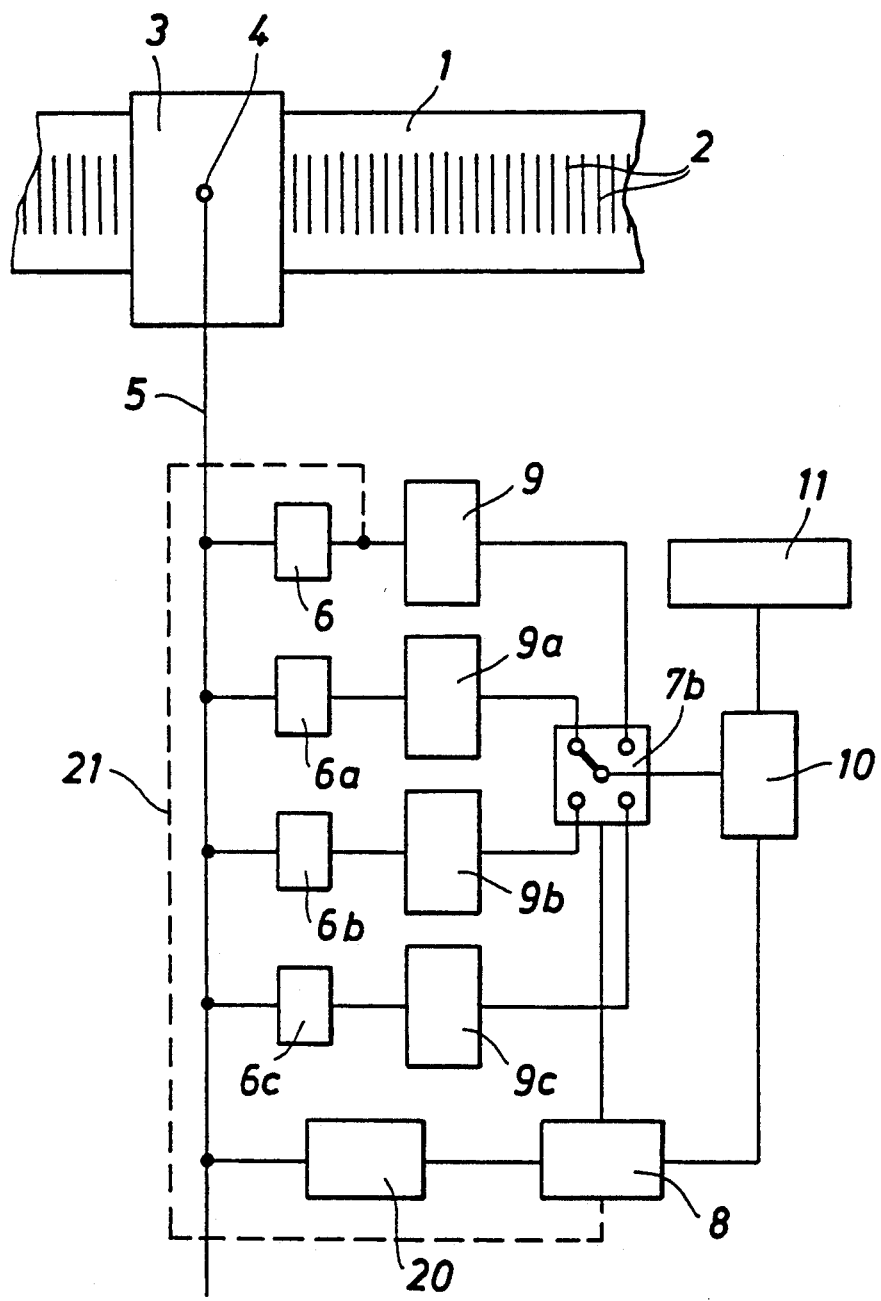
FIG. 4 is a block circuit diagram that is similar to FIG. 1 and illustrates a modified embodiment.

The embodiment shown in FIG. 4 differs from the embodiment of FIG. 1 in that a trigger and pulse-shaping stage 9 to 9c is associated with each dividing circuit 6 to 6c and digital countable signals appear at the output of the trigger and pulse-shaping stages 9 to 9c and are offset by a fractional part of a countable step from the basic signal. The selecting switch 7b is again controlled by the control logic 8 and is synchronized with the analog measured-value signals either by a separate synchronizing stage 20 connected to the lead 5 or, as is indicated in phantom by the line 21, by a connection to the output of one iterative dividing circuit.

The correction in accordance with the invention is mainly used for use with systems for measuring lengths but may also be used with systems for measuring angles or with synchros, i.e., with devices in which a sensitive mechanical correction was not possible at all in the past and any corrections which were required has to be effected by an addition or suppression of a countable step.

We claim:

1. In a method of electronically correcting position errors in the operation of a incremental measuring system, in which a scanning unit is caused to perform a scanning movement relative to a measuring scale consisting of a multiplicity of scale increments and to scan said scale during said scanning movement to generate basically sinusoidal analog measured-value signal indicating the direction of said scanning movement, said analog signals are electronically processed in a dividing stage to generate digital countable signals, which represent respective sub-incremental steps, which are substantially as large as fractional parts of one of said scale increments and are initiated at respective phase angles of said analog signals, which phase angles have a spacing which corresponds to said sub-incremental step, said countable signals are counted in a sense depending on the direction of said scanning movement, and the resulting counts are electronically evaluated, the improvement comprising defining additional phase angles between adjacent ones of said predetermine phase angles and offset from said predetermined phase angles by a predetermined fractional part of the spacing between said predetermined phase angles, and evaluating the resulting counts electronically after a correction of said countable signals on the basis of selected ones of said additional offset phase angles whereby corrections are effected in fraction parts of the sub-incremental steps.

2. The improvement set forth in claim 1 as applied to the electronic correction of position errors in an incremental system for measuring lengths.

3. In an incremental measuring system comprising a scale member provided with an incremental scale consisting of a multiplicity of scale increments, a scanning unit operable to effect a scanning movement relative to said scale, to scan said scale during said scanning movement and to generate basically sinusoidal analog measured-value signals, which depend on the direction of said scanning movement, dividing, trigger and pulse-shaping circuitry for receiving said analog signals and for generating digital countable signals in response to said analog signals, which countable signals represent respective sub-incremental steps, which are substantially as large as fractional parts of a scale increment, counting means for counting said countable signals in a sense depending on the direction of said scanning movement, and electronic evaluating means for evaluating the counts of said counting means, the improvement comprising electronic means for correcting position errors in the operation of the system, including at least two dividing circuits in said circuitry, which have taps having the same electrical spacing, which corresponds to said sub-incremental step, wherein said taps of each of said dividing circuits are electrically offset from the taps of each other one of said dividing circuits by a fractional part of said electrical spacing, each of said dividing circuits is selectively operable to receive said analog signal and to present a trigger level signal at each of said taps, additional trigger and pulse-shaping circuitry in said dividing, trigger and pulse-shaping circuitry for receiving said trigger level signals from said taps of said selectively operated dividing circuit and for generating said countable signals in response to said trigger level signals, a selecting switch connecting a selected one of said dividing circuits to said electronic evaluating means, and control means for controlling the operation of said selecting switch, said control means comprising a control logic arranged to prevent an operation of said selecting switch for initiating the operation of a given dividing circuit unless a countable signal has been generated in response to the operation of the currently operating one of said dividing circuits.

4. The improvement set forth in claim 3 as applied to a system for measuring lengths.

5. The improvement set forth in claim 3, wherein said circuitry comprises trigger and pulse-shaping circuits connected to the electronic evaluating means and said selecting switch is connected between said dividing circuits and said trigger and pulse-shaping circuit.

6. The improvement set forth in claim 3, wherein said trigger and pulse-shaping circuitry comprises a plurality of trigger and pulse-shaping stages associated with respective ones of said dividing circuits and said selecting switch consists of a digital data selecting switch connected between said trigger and pulse-shaping stages and said counting means 7. The improvement set forth in claim 3, wherein said selecting switch is arranged to be operable in synchronism with the occurrence of a predetermined level of at least one of said analog signals.

8. The improvement set forth in claim 3, wherein said selecting switch is arranged to be operable in synchronism with a predetermined phase angle of one of said signals.

9. The improvement set forth in claim 3, wherein said counting means comprise a counter adapted to be preset to a selected count and arranged to receive and count said countable signals and said selecting switch is arranged to determine another of said dividing circuits for selective operation in response to said counter assuming said selected count.

10. The improvement set forth in claim 9, wherein a temperature sensor for detecting the ambient temperature is provided and said counter is arranged to be preset to a count depending on the ambient temperature detected by said temperature sensor.

11. The improvement set forth in claim 3, wherein a correction memory is provided, which contains correction data at a plurality of addresses, which are associated with respective positions of said scanning unit relative to said scale, and said correction data are adapted to be retrieved from said memory and to be utilized to control the operation of said selecting switch.

12. The improvement set forth in claim 3, wherein said evaluating means comprise indicating means.

* * * * *